US012806115B2

(12) United States Patent
Stewart

(10) Patent No.: US 12,806,115 B2
(45) Date of Patent: Nov. 24, 2026

(54) VIBRATING STIMULATION DEVICE WITH VARIABLE PRESSURE APPARATUS

(71) Applicant: Larry L. Stewart, Stillwater, OK (US)

(72) Inventor: Larry L. Stewart, Stillwater, OK (US)

( * ) Notice: Subject to any disclaimer, the term of this patent is extended or adjusted under 35 U.S.C. 154(b) by 819 days.

(21) Appl. No.: 18/184,770

(22) Filed: Mar. 16, 2023

(65) Prior Publication Data

US 2023/0293385 A1 Sep. 21, 2023

Related U.S. Application Data

(60) Provisional application No. 63/320,821, filed on Mar. 17, 2022.

(51) Int. Cl.
*A61H 19/00* (2006.01)

(52) U.S. Cl.
CPC ............ *A61H 19/32* (2013.01); *A61H 19/50* (2013.01)

(58) Field of Classification Search
CPC .................... A61H 19/32; A61H 19/50; A61H 2201/1238; A61H 2201/1253; A61H 2201/1409; A61H 9/0057
USPC ...................................................... 600/38–41
See application file for complete search history.

(56) References Cited

U.S. PATENT DOCUMENTS

| | | | | |
|---|---|---|---|---|
| 5,693,002 A * | 12/1997 | Tucker | A61H 19/30 600/38 |
| 6,464,653 B1 | 10/2002 | Hovland et al. | |
| D649,656 S | 11/2011 | Petersen | |
| 9,763,851 B2 | 9/2017 | Lenke | |
| 2006/0116612 A1* | 6/2006 | Drysdale | A61H 19/34 601/6 |
| 2009/0275796 A1* | 11/2009 | Gil | A61H 19/44 600/38 |
| 2012/0150076 A1 | 6/2012 | Clarvoe | |
| 2016/0151236 A1* | 6/2016 | Makower | A61H 19/50 601/48 |
| 2017/0027809 A1* | 2/2017 | Lenke | A61H 23/0263 |
| 2018/0125748 A1* | 5/2018 | Goldenberg | A61H 23/0263 |
| 2019/0343714 A1* | 11/2019 | Gordon | A61H 19/34 |
| 2020/0188221 A1 | 6/2020 | Lenke | |
| 2021/0113424 A1 | 4/2021 | Yates | |

FOREIGN PATENT DOCUMENTS

| | | |
|---|---|---|
| CN | 103796619 | 5/2014 |
| WO | 2018195690 | 1/2018 |

* cited by examiner

*Primary Examiner* — Sunita Reddy
(74) *Attorney, Agent, or Firm* — Gravis Law, PLLC; Stephen S. Zimowski

(57) ABSTRACT

Disclosed is a masturbatory device combining stimulation from electronic vibration with suction and targeted air stimulation, the device being operable by an individual or by a partner during sexual activities and including a cup-shaped body affixed to a variable pressure apparatus, the cup-shaped body designed to attach to the vibrating end of a vibrating device and the variable pressure apparatus including a suction tube in fluid communication with an air-passage conduit contacting the user's body through which the user can apply positive or negative pressure to the contacted area.

20 Claims, 10 Drawing Sheets

FIG. 4A
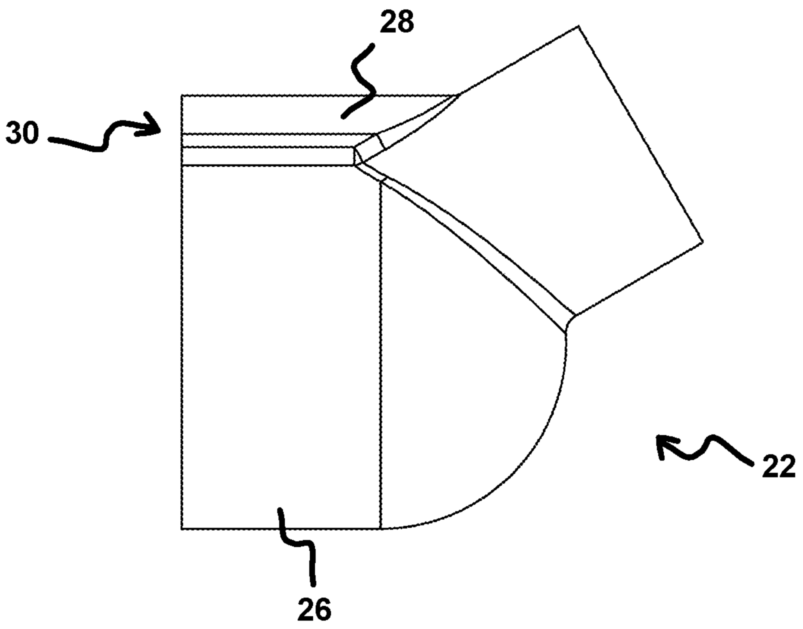
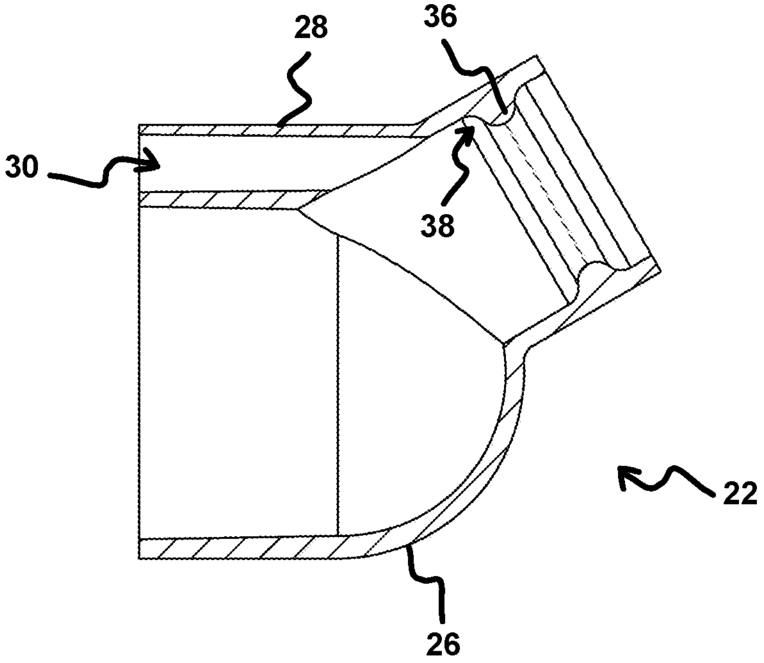
FIG. 4B

VIBRATING STIMULATION DEVICE WITH VARIABLE PRESSURE APPARATUS

FIELD OF THE INVENTION

The present technology relates to the field of sexual stimulation devices, and more specifically to sexual stimulation devices employing vibration, suction, and targeted air stimulation.

BACKGROUND OF THE INVENTION

Research indicates that nearly 40 percent of women and more than 60 percent of men report masturbating on a regular basis. Masturbation is more common among females ages 20 to 39 and in populations with higher levels of education. Research further indicates that masturbation is beneficial to physical, mental, and sexual health, can provide pain relief and improve sleep, and improves intimacy in relationships where partners engage in sexual activities involving mutual masturbation.

Many devices are presently on the market to assist couples and individuals in exploring masturbatory activities. These devices are well-known and include many famous examples, including the device depicted in U.S. Design Patent No. 649,656 and other, similar designs, commonly referred to as "Magic Wand" devices. Many such devices combine electronically induced vibration with electronically induced suction and/or other pressure field generation, among other examples.

Male and female erogenous zones can be stimulated by a variety of different techniques, including the stimulation of a particular area of the skin by direct contact vibration. In particular, a device's direct stimulation of the female clitoris by vibration is a commonly employed masturbatory technique. Because the entire clitoris is equipped with numerous nerve endings, it is particularly touch-sensitive and responsive to stimulation by vibration. Furthermore, research indicates that stimulation of the female clitoris is the most common starting point of the female climax and a woman's sexual arousal and thereby the key to female "sexual pleasure".

The sensitivity of the human erogenous zones, however, differs significantly from one individual to the next. Indeed, for some, direct vibration applied to an erogenous zone, such as the female clitoris, is excessive and may even cause discomfort rather than stimulation and arousal. And the sensitivity of certain erogenous zones may change over time, from one encounter to another, and even during sexual activity, such as during climax or shortly after climax is achieved.

Accordingly, direct vibratory stimulation may be less desirable for some, and indirect stimulation may be preferable. For indirect stimulation of erogenous zones, and especially the female clitoris, conventional vacuum devices are commonly used to arouse the erogenous zones without direct contact. For example, manual and electronic vacuum pumps are known and typically employ one or more suction cups to surround the targeted erogenous zone, rather than contacting it directly. The negative-pressure exerted by such vacuum devices on the clitoris, for example, leads to an enlargement of the clitoris and/or stimulates the blood flow in the affected area. This vascular clitoral engorgement serves to promote desire by increasing sensitivity and vaginal excretion, which can make sexual activities more pleasurable.

However, the frequent use of such negative-pressure devices may become habitual and limit the effectiveness of this type of stimulation. And a pure increase in the clitoral blood flow is often insufficient to reach a climax, so such devices are often used only as foreplay, and climax may be achieved only through direct vibratory contact with the erogenous zone. Such devices operating electronically also often lack the ability to adjust to suit a particular user's needs and apply negative-pressure to maximize individual stimulation. And manually-operated pump devices typically employ a hand pump that can be clumsy and ineffective and distract the user from focusing on the masturbatory and sexual activity.

Some electrically driven vacuum pumps also suffer from other drawbacks, such as unintentionally drying the contacted erogenous zone due to continuous airflow. Some such devices also employ cyclical stimulation, which are more likely to lead to habituation effects as well. And those devices that employ a control valve or modulator that the user can manually adjust by hand to vary the amount of vacuum in the suction chamber may be distracting or diverting under certain circumstances. Some electronically driven vacuum devices can also provide positive-pressure stimulation. However, doing so electronically suffers from similar drawbacks to those mentioned above, including the risk of excessive drying of the erogenous area, and employing a hand pump to operate such positive-pressure applications manually can likewise be clumsy, ineffective, and distracting.

Accordingly, there remains a need in the market for a device capable of stimulation uniquely controlled by the user(s) combining vibration with individualized suction and/or targeted air stimulation and conveniently operable by an individual or by one participant in sexual activity to provide stimulation to another's erogenous zone(s).

SUMMARY OF THE INVENTION

It is accordingly an objective of the present invention to provide a masturbatory device designed to combine stimulation from electronic vibration and individually managed suction and/or targeted air stimulation. It is a further objective of the present invention to facilitate operation of the present invention's device by an individual masturbating alone or by a sexual partner during mutual masturbatory and other sexual activities. It is also an objective of the present invention to provide users of the device with an intimate experience targeted to his or her individual needs and preferences rather than exclusively relying on electronic stimulation.

To accomplish these and other objections, the present invention provides a device attachable to a standard high-speed vibrator. Such vibrators may include settings for low, medium, or high speed of vibration, for example. The device attaches to such vibrating devices and includes a mouthpiece part that has connecting air tubes/holes to deliver air sensation directly to the user's erogenous zones. The device also includes a suction cup portion that is placed against the user's skin on or around the erogenous zone. The user can thus use the mouthpiece to slowly apply positive or negative pressure (e.g. suction or blowing) on the erogenous zone at the desired level of intensity. Meanwhile, the vibrating device provides a vibrating sensation to the erogenous area at the same time.

The device is intended to combine the stimulation of the vibrating attachment with the stimulation of positive or negative pressure on the directed erogenous area. Preferable embodiments of the device include varying sizes of tubes, suction cup portions, etc. The device operates to apply stimulating positive air pressure to the erogenous zone during vibration or apply negative air pressure drawing the anatomy into the suction cup part to increase the effect of the vibration. The device also allows for manually controlled variations of the pressure applied and allows the user to alternate between positive and negative pressure to provide an individualized experience for the user and partner, when used together.

To further accomplish its objectives, the present invention provides a device and apparatus designed to attach to the vibrating end of other masturbatory devices currently on the market. The present invention accordingly preferably includes a thermoplastic elastomer cup-shaped body adapted to receive the vibrating end of a "Magic Wand" or other masturbatory device. The cup-shaped body is preferably made of a thermoplastic elastomeric material, but other materials may be used as well, as one of skill in the art will recognize. The cup-shaped body is sized to receive, encircle, and attach to the vibrating end of a masturbatory device while in use. Preferable embodiments are attachable and detachable through manually sliding the cup-shaped body over the end of the masturbatory device, though some preferable embodiments may also employ other means, such as clasps or the like, to retain the present invention's attachment thereto.

Opposite the open end of the cup-shaped body, the present invention includes a variable pressure apparatus. The variable pressure apparatus includes an air-passage conduit intended for direct contact with the user's erogenous zone (s). The air-passage conduit is preferably substantially cylindrical but may be tapered or formed of other shapes as well. The air-passage conduit preferably includes an extension portion that attaches the air-passage conduit to the variable pressure apparatus's main body as well as a body-contact ring that is placed against the user's skin during use. The extension portion is preferably comprised of a rigid material or semi-rigid material to ensure it substantially retains its form during use. The body-contact ring is likewise preferably comprised of a rigid material or semi-rigid material and is preferably smooth to avoid any chafing or irritation during use and to ensure the ability to create an air-tight seal when placed adjacent to the user's skin. Both the extension portion and the body-contact ring of the air-passage conduit may be made of glass, acrylic, or polyethylene, polypropylene, polycarbonate, or polymethyl methacrylate, for example.

The variable pressure apparatus's main body also includes a hood and a tube-attachment conduit therethrough, the tube-attachment conduit being sized and situated to receive the manually operable suction tube. The hood of the main body surrounding the tube-attachment conduit is preferably made of a rubber material capable of deforming to snugly accept the manually operable suction tube and create a seal between the tube-attachment conduit and manually operable suction tube's hose attachment, though other available materials will be known to those of skill in the art to accomplish the same functions.

The manually operable suction tube includes the hose attachment and mouthpiece for application of positive or negative pressure to the erogenous zone. The user places the body contact ring of the air-passage conduit in the desired position and, with the manually operable suction tube in place, can provide suction or blow air through the variable pressure apparatus to stimulate the contacted erogenous zone, accomplishing certain objectives of the present invention. Meanwhile, the cup-shaped body's attachment to a vibrating device provides vibration stimulation to the erogenous zone as well, further accomplishing the objectives of the present invention.

While the use of a mouthpiece is preferable for the manually operable suction tube, other methods of manually providing positive and negative pressure to the erogenous zone, such as hand-pumps and the like, will be known to those of skill in the art and are also available for use with the present invention. The hose attachment of the manually operable suction tube must fit snugly within the tube-attachment conduit so as to ensure the variable pressure apparatus is substantially sealed from mouthpiece to body-contact ring of the air-passage conduit to provide for sealed fluid communication throughout the variable pressure apparatus.

The hose attachment is preferably made of a semi-rigid polyethylene material to provide rigid flexibility to maneuver the manually operable suction tube during the present invention's use. The mouthpiece is preferably designed to avoid unintentionally slipping from the user's mouth and may be rigid or semirigid and preferably likewise formed of a polyethylene material. In some preferable embodiments, the mouthpiece may be nothing more than one or more circumferential ridges around the user-end of the hose attachment.

In some preferable embodiments, the suction tube includes a hose clip attachable to the hose attachment to collapse the hose attachment and maintain constant air pressure within the variable pressure apparatus while the body-contact ring of the air-passage conduit is sealed against the user's skin. In such embodiments, the user may create the desired level of negative pressure within the variable pressure apparatus using the mouthpiece or other pump device and then attach the hose clip to maintain the negative pressure without continuing to operate the mouthpiece or pump, allowing the user to focus on the stimulation rather than the device's operation.

As those skilled in the art will appreciate, the present invention is not limited to the embodiments and arrangements described above. Other objects of the present invention and its particular features and advantages will become more apparent from consideration of the following drawings and

BRIEF DESCRIPTION OF THE DRAWINGS

FIG. 4A is an orthogonal view from a side of portions of a stimulation device with variable pressure apparatus according to the preferable embodiments of the present invention depicted in FIGS. 1-3.

FIG. 4B is a cross-sectional view from a side of portions of a stimulation device with variable pressure apparatus according to the preferable embodiments of the present invention depicted in FIGS. 1-3 and 4A.

DETAILED DESCRIPTION OF THE INVENTION

The following detailed description illustrates the present invention by way of example, not by way of limitation of the principles of the invention. This description will enable one skilled in the art to make and use the invention, and describes several embodiments, adaptations, variations, alternatives and uses of the invention, including what is presently believed to be the best mode of carrying out the invention. One skilled in the art will recognize alternative variations and arrangements, and the present invention is not limited to those embodiments described hereafter.

Figure 1A:
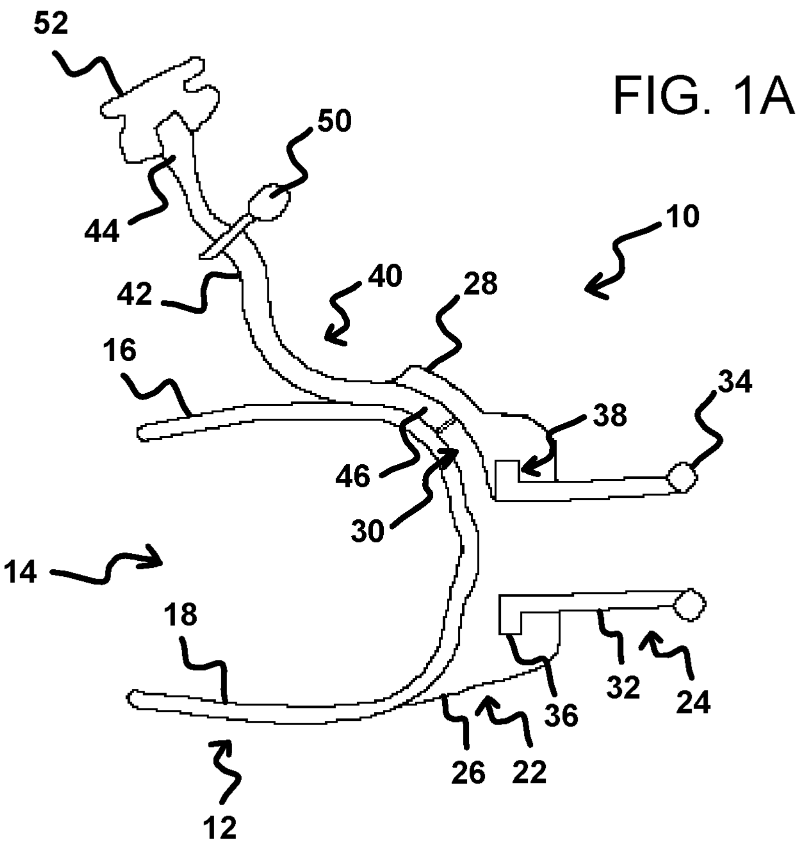
FIG. 1A is a cross-sectional view from the side of a stimulation device with variable pressure apparatus according to preferable embodiments of the present invention.

Referring to FIG. 1A, an exemplary embodiment of the present invention is depicted in cross-sectional form from a side of the device 10. The device 10 includes a cup-shaped body 12, on the left in FIG. 1A, and a variable pressure apparatus 22 connected thereto. The cup-shaped body 12 includes an open end 14 for receiving the vibrating end of a vibration device (not depicted), such as a "Magic Wand" or the like. The outer wall 16 of the cup-shaped body is preferably tapered, as depicted, to retain the vibrating device therein. Some preferable embodiments may also or alternatively employ clasps or the like to retain the vibrating device within the cup-shaped body 12. The cup-shaped body 12 is preferably made of a semi-rigid thermoplastic elastomer such that it can deform slightly as the vibrating device is introduced and return to its initial shape upon complete insertion of the vibrating device, retaining the vibrating device therein.

The diameter of the inner wall 18 of the cup-shaped body 12 preferably varies as the cup-shaped body 12 tapers, as depicted. In some preferable embodiments, the largest diameter within the cup-shaped body 12 is between 4 and 8 centimeters, and more preferably between 5 and 7 centimeters, and even more preferably around 6 centimeters. Likewise, the diameter of the inner wall 18 of the cup-shaped body near the open end 14 designed to receive the vibrating device is preferably between 3.5 and 7.5 centimeters, and more preferably between 4.5 and 6.5 centimeters, and even more preferably around 5.5 centimeters. Those of skill in the art will understand, however, that the size and shape of the cup-shaped body 12 is not intended to be limited, and is intended to be directed to ensuring that the cup-shaped body 12 can encircle and retain the vibrating end of the vibrating device to which it is attached.

The present invention's variable pressure apparatus 22 is preferably affixed to the cup-shaped body 12, as depicted in FIG. 1A, although it may be removably attachable to the cup-shaped body 12, either in whole or in part. The variable pressure apparatus 22 includes the air-passage conduit 24 comprised of an extension portion 32 and a body contact ring 34 in preferable embodiments, as depicted in FIG. 1A. The extension portion 32 is preferably affixed to the variable pressure apparatus's main body 26, which preferably includes a hood 28 and a tube-attachment conduit 30, as depicted. In some preferable embodiments, the device 10 may be provided with several air-passage conduits 24 with varying sizes and designs, each of which is removably attachable to the variable pressure apparatus's main body 26 in such preferable embodiments.

The tube-attachment conduit 30 is designed to receive the hose attachment portion 42 of the suction tube 40 and create a substantially air-tight seal therearound such that the entire variable pressure apparatus 22 is in sealed fluid communication from the manual operation end 44 of the suction tube 40, whereupon a mouthpiece 52 is preferably situated, to the body-contact ring 34 of the air-passage conduit 24, as depicted in FIG. 1A.

In operation, the user connects the cup-shaped body 12 around the vibrating end of a vibrating masturbatory device and then places the body-contact ring 34 against the skin on or around the desire erogenous zone. The user can then apply positive or negative pressure by blowing into or pulling air out of, respectively, the mouthpiece 52 of the suction tube 40. Because each part of the variable pressure apparatus 22 is in substantially sealed fluid communication, the positive or negative pressure the user creates at the mouthpiece end 44 of the suction tube 40 is transferred through the device to the body-contact ring 34 of the air-passage conduit 24, stimulating the erogenous zone as intended. At the same time, vibration from the vibrating device is transferred through the cup-shaped body 12 into the variable pressure apparatus 22, thereby providing vibratory stimulation to the erogenous zone simultaneously.

Figure 1B:
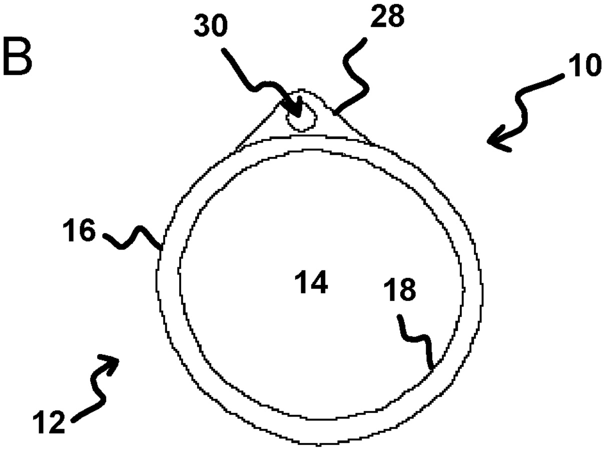
FIG. 1B is a perspective view from behind of the stimulation device with variable pressure apparatus according to the preferable embodiments of the present invention depicted in FIG. 1A.

As depicted in FIG. 1A, the tapered cup-shaped body 12 is preferably affixed to the variable pressure apparatus 22, specifically to the variable pressure apparatus's main body 26. Like the cup-shaped body 12, the main body 26 extends circumferentially around the entire device, as depicted in FIGS. 1A and 1B. The main body 26 includes the hood 28 surrounding the tube-attachment conduit 30, as depicted as well in the figures. The main body 26 of the variable pressure apparatus 22 is preferably primarily made of a rigid or semi-rigid material, such as acrylic or other plastic.

The hood 28, which surrounds the tube-attachment conduit 30 as depicted, is preferably made of a more deformable material, such as rubber or polyethylene, such that it deforms and forms a seal around the suction tube 40 when inserted. The suction tube 40 is preferably detachable from the variable pressure apparatus's main body 26, facilitating cleaning of both the main body 26 and the suction tube 40, and of the variable pressure apparatus 22 as a whole. In some embodiments, however, the suction tube 40 is affixed to the main body 26, and the hood 28 and main body 26 may be made of the same material, be it semi-rigid rubber, polyethylene, or the like or a more rigid acrylic, plastic, or the like. Such materials are exemplary only and do not limit the range of suitable materials, which will be known to those of skill in the art.

The main body 26 preferably includes a groove or cut-out 38 within which a projection 36 on the extension portion 32 of the air-passage conduit 24 is seated, connecting the air-passage conduit 24 to the variable pressure apparatus's main body 26, as depicted in FIG. 1A. The projection 36 preferably extends laterally and outwardly from the extension portion 32 and preferably at or near the end of the extension portion 32 opposite the end at which the body-contact ring 34 is situated, as depicted in FIG. 1A. As those of skill in the art will recognize, the opposite design is equally suitable, with a projection 36 extending laterally from the main body 26 into a groove or cut-out 38 in the extension portion 32 of the air-passage conduit 24.

The air-passage conduit's extension portion 32 and body-contact ring 34, particularly, are preferably made of a smooth, rigid or semi-rigid material, such as glass, acrylic, or the like. The body-contact ring 34 need be particularly smooth to avoid chafing or irritation during the device's use, since it is in direct contact with the user's skin. Furthermore, the body-contact ring 34 must capably form a seal against the user's skin to facilitate negative-pressure stimulation of the user's erogenous zone. In some preferable embodiments, the body-contact ring 34 and extension portion 32 of the air-passage conduit 24 are made of the same material while in others they are different, for example with the body-contact ring 34 comprising a more rigid material and the extension portion 32 being more semi-rigid and pliable.

Figure 2:
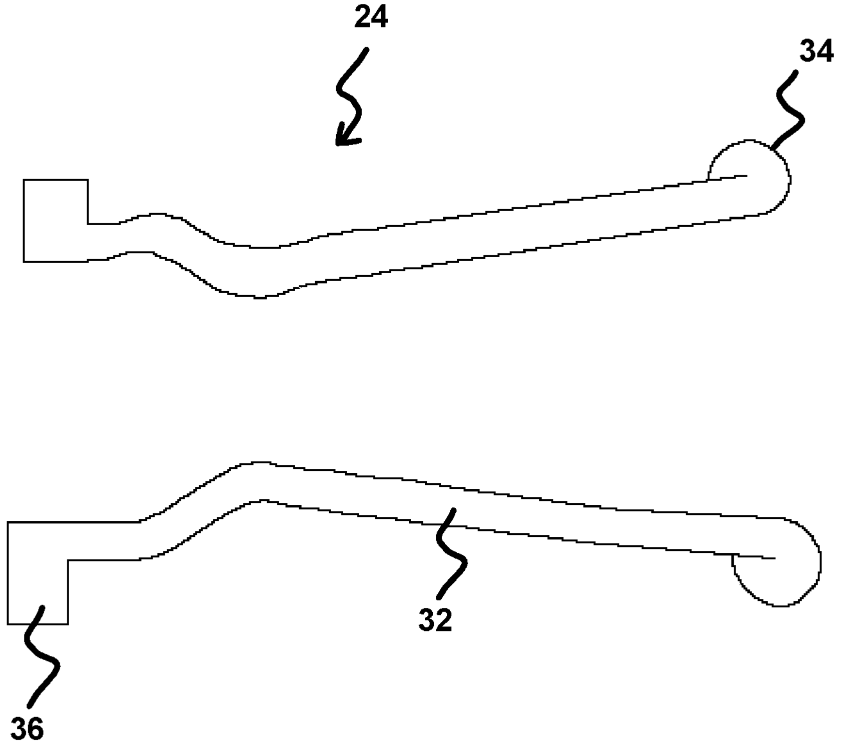
FIG. 2 is a partial cross-sectional view from the side of the stimulation device with variable pressure apparatus according to the preferable embodiments of the present invention depicted in FIG. 1.

In some preferable embodiments, the air-passage conduit 24 is designed to be removably attached to the main body 26 of the variable pressure apparatus 22. Such embodiments help facilitate cleaning of the present invention and allow the use of a variety of designs for the air-passage conduit 24. The air-passage conduit 24 depicted in FIG. 1A, for example, is substantially cylindrical in shape. However, other shapes and designs are also available, as will be understood to one of skill in the art, such as the tapered design depicted in FIG. 2. Thus, a user can change out one air-passage conduit 24 for another depending on the user's intended use and the erogenous zone the user intends to apply the device 10 to, facilitating more unique and individualized experiences.

In preferable embodiments wherein the air-passage conduit 24 is removably attached to the main body 26 of the variable pressure apparatus 22, the main body 26 and the extension portion 32 of the air-passage conduit(s) 24 are preferably comprised of semi-rigid materials capable of deforming to facilitate attaching and detaching from one another. For example, the main body 26 may be made of rubber while the extension portion 32 is made of malleable polyethylene, or the like, as will be understood to those of skill in the art. Such preferable embodiments preferably employ the projection-groove 36, 38 attachment method discussed above and depicted in FIG. 1A, but other means of removably attaching one to the other are also available, such as clasps and the like, as will be known to those of skill in the art.

The suction tube 40, which preferably includes a mouthpiece 52 on the manual operation end 44 of the hose attachment 42 opposite the end 46 intended to be inserted into the tube-attachment conduit 30, as depicted in FIG. 1A, is preferably made of a malleable, semi-rigid material, such as polyethylene or other well know semi-rigid plastics. The hose attachment 42, particularly, should be subject to bending and repositioning by the user to advance the stimulation goals of the present invention. Likewise, the hose attachment 42 is preferably of sufficient length to facilitate operation by mouth while the device is in contact with an erogenous zone, and is preferably at least 3-5 feet long, recalling that the present invention is intended both for individual use and use by partners during sexual activities. Preferable embodiments of the hose attachment 42 are thus made of semi-rigid, clear polyethylene or polyvinyl material and have a diameter preferably between ⅛ and ½ and inch, and more preferably of around ¼ inch.

The mouthpiece 52 is preferably made of a rigid or semi-rigid material, where employed, and is preferably designed to fit comfortably in the user's mouth without inadvertently falling out during use of the device. While the use of a mouthpiece 52 is preferable, other manners of introducing positive or negative pressure in the variable pressure apparatus are also within the scope of the present invention, such as the use of a hand pump or the like. Electronic means are likewise available, although manually-operated methods are preferable to increase intimacy and provide a more individualized user experience.

In some preferable embodiments, the suction tube 40 also includes a hose clip 50 removably attachable to the hose attachment 42, as depicted in FIG. 1A, capable of collapsing and sealing the hose attachment 42 to maintain constant pressure within the variable pressure apparatus 22 without any operation by the user. For example, the user may have created a negative-pressure state within the air-passage conduit 24 by drawing air through the mouthpiece 52 and may wish to maintain that pressure state while focusing on the vibratory stimulation being provided by the vibrating device. In such circumstances, the user may attach the hose clip 50 to the hose attachment 42 and release the mouthpiece 52 or other means of providing positive and negative pressure in the variable pressure apparatus 22. The hose clip 50 must be capable of creating enough pressure to collapse the walls of the hose attachment 42 together in order to create a seal and may be spring loaded or otherwise designed to pinch down on the hose attachment 42 with some force. The hose clip 50 is thus preferably made of a relatively high-rigidity material that is capable of applying constant force once attached until the user removes or otherwise manipulates it.

Some preferable embodiments also include the ability to bleed air from the variable pressure apparatus 22 even when the hose clip 50 is engaged or the suction tube 40 is otherwise unable to expel air. Such embodiments help to facilitate adjusting the negative pressure within the variable pressure apparatus 22 to provide the user with a more individualized experience, accomplishing certain objectives of the present invention. Those of skill in the art will recognize the benefits of such designs, and others, in maximizing the available variations for providing stimulation depending on individual preferences.

Figure 3A:
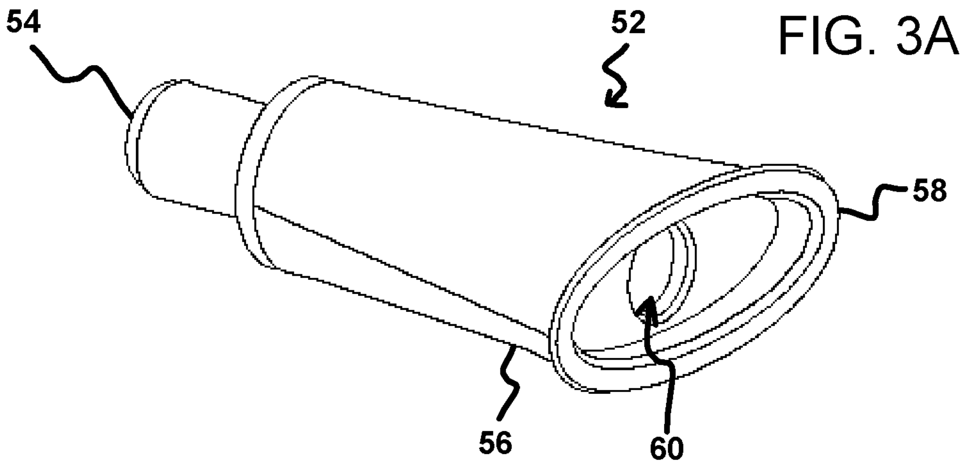
FIG. 3A is a perspective view of an exemplary embodiment of a mouthpiece according to the preferable embodiments of the present invention depicted in FIGS. 1-2.
Figure 3B:
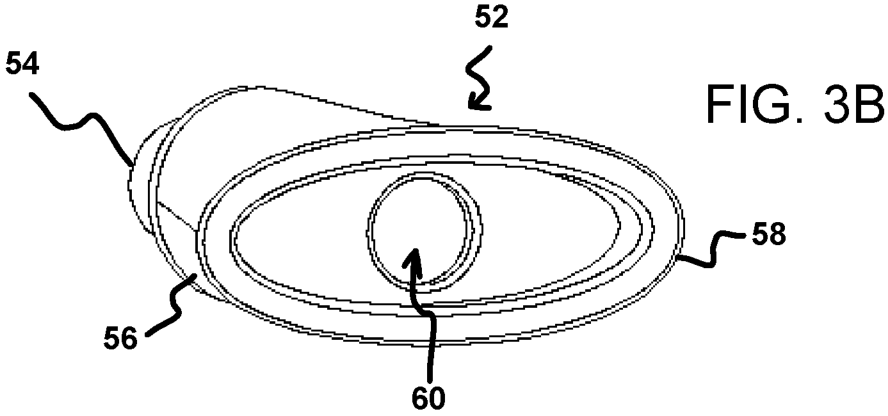
FIG. 3B is a perspective view of an exemplary embodiment of a mouthpiece according to the preferable embodiments of the present invention depicted in FIGS. 1-2 and 3A.
Figure 3C:
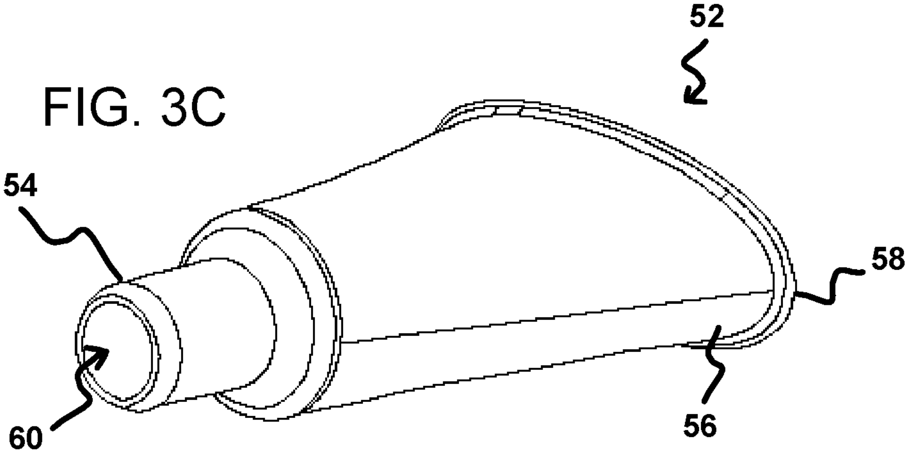
FIG. 3C is a perspective view of an exemplary embodiment of a mouthpiece according to the preferable embodiments of the present invention depicted in FIGS. 1-2 ans 3A-B.

Referring now to FIGS. 3A-C, depicted are perspective views of a preferable embodiment of a mouthpiece 52 suitable for use with preferable embodiments of the present invention. As depicted, the mouthpiece 52 includes an attachment end 54 for attachment to the hose attachment 42 of the suction tube 40 and a contact end 56 that the user places in his or her mouth during use of the device 10. The mouthpiece 52 is preferably tapered, as depicted, to provide a comfortable fit within the user's mouth, creating a cylindrical shape on the attachment end 54 and an oblong oval on the contact end 56, as depicted. The contact end 56 preferably includes a ridge 58, as depicted, to assist the user in retaining the mouthpiece 52 in his or her mouth during use. An aperture 60 extends from the contact end 56 to the attachment end 54 to transfer the positive or negative air pressure the user creates into the hose attachment 42 and, ultimately, to the user's erogenous zone where the body contact ring 34 is placed.

Figure 4C:
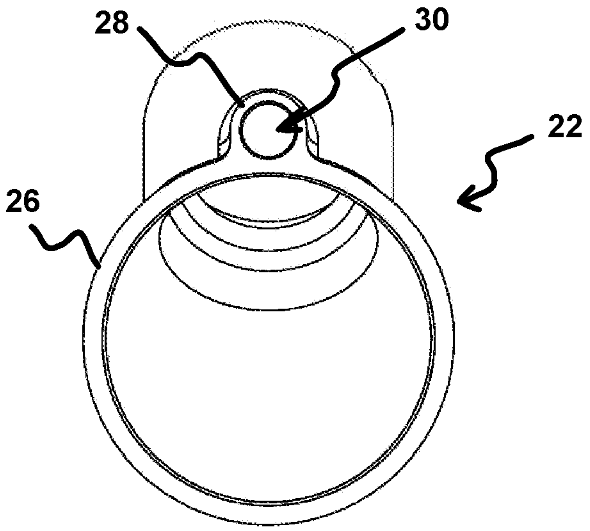
FIG. 4C is an orthogonal view from behind of portions of a stimulation device with variable pressure apparatus according to the preferable embodiments of the present invention depicted in FIGS. 1-3 and 4A-B.

Referring next to FIGS. 4A-C, a preferable embodiment of the variable pressure apparatus 22 is shown disconnected from both the cup-shaped body 12 and the air-passage conduit 24. In some preferable embodiments, the variable pressure apparatus 22 is removably attachable to each of the cup-shaped body 12 and the air-passage conduit 24 while in others it is affixed to either or both, as will be understood by those of skill in the art. As depicted particularly in FIGS. 4A and 4B, the variable pressure apparatus 22 includes the main body 26, which at one end is designed to receive, surround, and envelop the cup-shaped body 12 and at the other end is designed to receive, surround, and envelop the air-passage conduit 24.

The variable pressure apparatus 22 also includes the hood 28 surrounding and creating the tube-attachment conduit 30, as depicted, into which the suction tube 40 is inserted for use. The tube-attachment conduit 30 is in fluid communication with the air-passage conduit 24 via the main body 26 of the variable pressure apparatus 22. Preferable embodiments of the main body 26 further employ a projection or ridge 36 extending inwardly from main body's 26 inner wall near the end of the main body 26 adapted to receive the air-passage conduit 24, as depicted in FIG. 4B. In addition or alternatively, the main body 26 may also include a groove or cut-out 38 in the same area, in some preferable embodiments, into which may be inserted a projection or ridge 36 extending circumferentially from the extension portion 32 near its end opposite the end where the body-contact ring 34 is located.

Figure 5A:
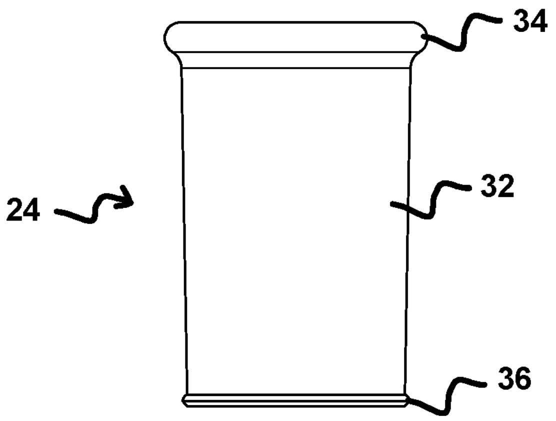
FIG. 5A is an orthogonal view from a side of an air-passage conduit of a stimulation device with variable pressure apparatus according to the preferable embodiments of the present invention depicted in FIGS. 1-4.
Figure 5B:
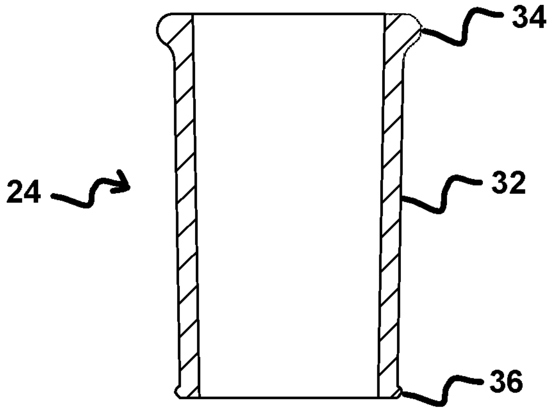
FIG. 5B is a cross-sectional view from a side of an air-passage conduit of a stimulation device with variable pressure apparatus according to the preferable embodiments of the present invention depicted in FIGS. 1-4 and 5A.

Referring now to FIGS. 5A-B, depicted is a preferable embodiment of an air-passage conduit 24 of the device 10 of the present invention. As noted, preferable embodiments of the device 10 include several, interchangeable air-passage conduit 24 that can be attached to the variable pressure apparatus 22 with varying features and designs. As those of skill in the art will recognize, as the portion of the device 10 that is in contact with the user's skin, and in particular with the user's erogenous zone(s), varying designs of the variable pressure apparatus 22 help to create a more pleasurable, individualized experience for the user(s).

The preferable embodiment depicted in FIGS. 5A-B is substantially cylindrical and includes the extension portion 32 and body contact ring 34 at the end of the extension portion 32 intended to contact the user's skin. Also depicted is the raised ridge/projection 36 disposed at or near the opposite end, which engages with the groove or cut-out 38 in the main body 26 of the variable pressure apparatus 22 in preferable embodiments of the present invention. As will be understood to those of skill in the art, one or both of the extension portion 32 of the air-passage conduit 24 and the main body 26 of the variable pressure apparatus 22 is comprised of a semi-rigid, malleable material that allows for deformation during attachment/removal of the various air-passage conduits 24, in preferable embodiments of the device 10.

Figure 6A:
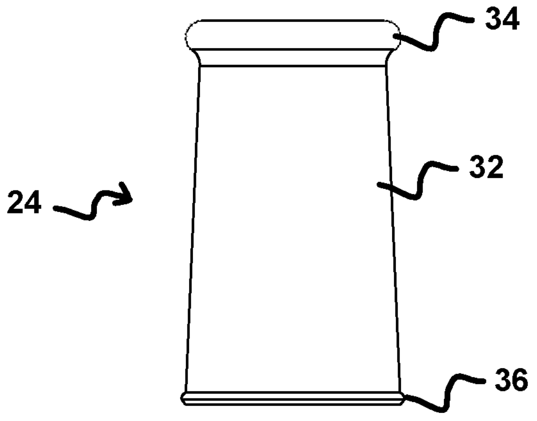
FIG. 6A is an orthogonal view from a side of an air-passage conduit of a stimulation device with variable pressure apparatus according to the preferable embodiments of the present invention depicted in FIGS. 1-5.
Figure 6B:
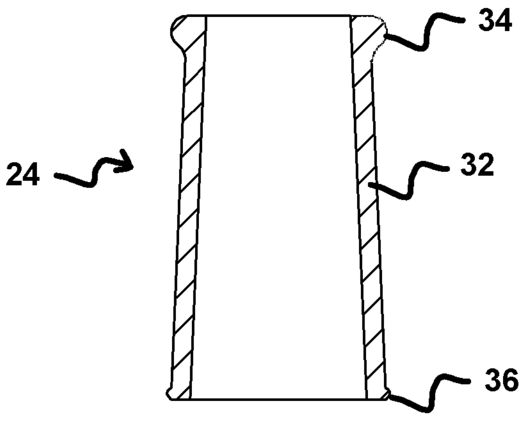
FIG. 6B is a cross-sectional view from a side of an air-passage conduit of a stimulation device with variable pressure apparatus according to the preferable embodiments of the present invention depicted in FIGS. 1-5 and 6A.
Figure 7A:
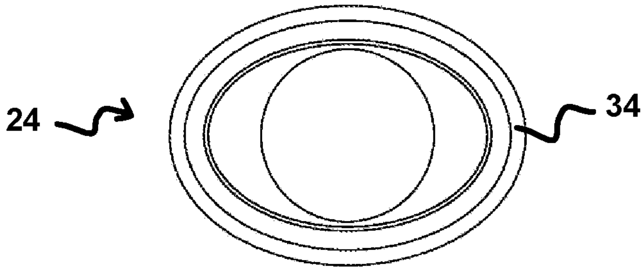
FIG. 7A is an orthogonal view from above of an air-passage conduit of a stimulation device with variable pressure apparatus according to the preferable embodiments of the present invention depicted in FIGS. 1-6.
Figure 7B:
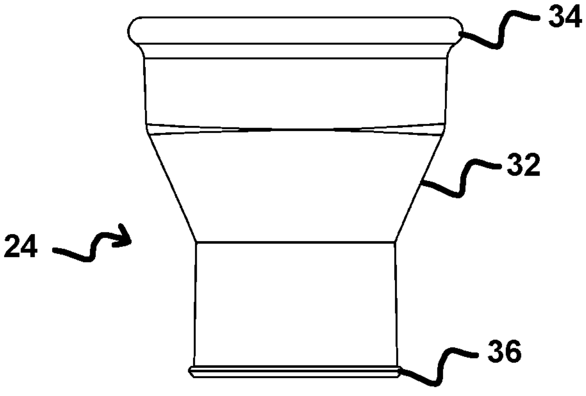
FIG. 7B is an orthogonal view from a side of an air-passage conduit of a stimulation device with variable pressure apparatus according to the preferable embodiments of the present invention depicted in FIGS. 1-6 and 7A.
Figure 7C:
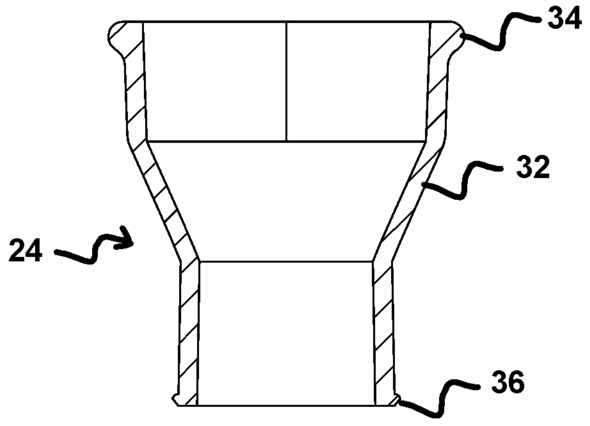
FIG. 7C is a cross-sectional view from a side of an air-passage conduit of a stimulation device with variable pressure apparatus according to the preferable embodiments of the present invention depicted in FIGS. 1-6 and 7A-B.
Figure 7D:
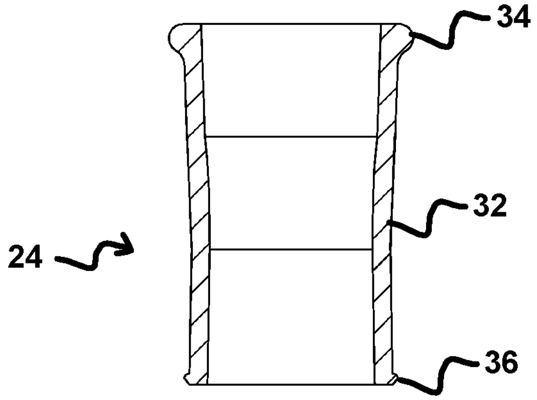
FIG. 7D is a cross-sectional view from a side of an air-passage conduit of a stimulation device with variable pressure apparatus according to the preferable embodiments of the present invention depicted in FIGS. 1-6 and 7A-C.

FIGS. 6A-B present another preferable embodiment of an air-passage conduit 24 of the device 10 of the present invention. In this instance, the preferable embodiment is tapered with increasing diameter along the extension portion 32 from the contact ring 34 end to the raised ridge/projection 36 end, creating a tapered conical shape. As those of skill in the art will recognize, a circular cross-sectional shape is preferable for the air-passage conduits 24, but numerous other shapes and arrangements may be included as well to provide for variations to the user experience.

One such additional variation is depicted in FIGS. 7A-D. Rather than a cylindrical or conical shape, the air-passage conduit 24 depicted employs an oval, rather than circular cross-sectional shape and contains inconsistent variations in diameter along the length of the extension portion 32. The design depicted in FIGS. 7A-D provides for a contact ring 34 covering a larger area for an improved, individualized user experience. The end of the extension portion 32 with the raised ridge/projection 36 and the raised ridge/projection 36 itself is preferably consistent in size across the varying designs depicted in FIGS. 5-7, making the various air-passage conduits 24 interchangeable and usable with a single device 10 with consistent size of the variable pressure apparatus 22 and its main body 26 employing its own projection 36 and or groove or cut-out 38.

Figure 8A:
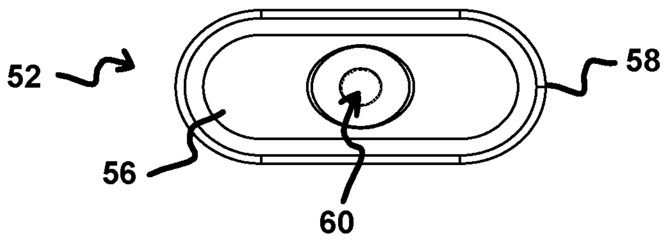
FIG. 8A is an orthogonal view from above of a mouthpiece of a stimulation device with variable pressure apparatus according to the preferable embodiments of the present invention depicted in FIGS. 1-7.
Figure 8B:
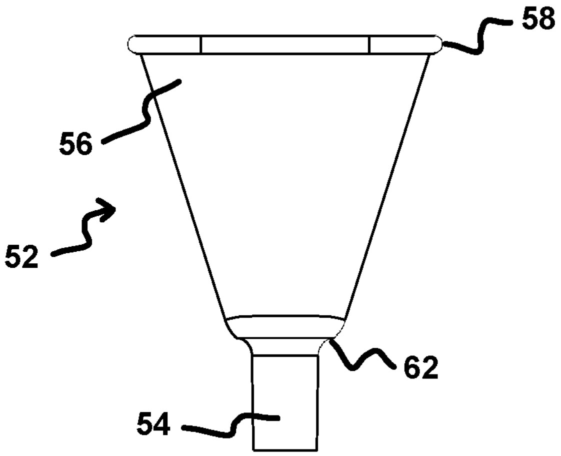
FIG. 8B is an orthogonal view from a side of a mouthpiece of a stimulation device with variable pressure apparatus according to the preferable embodiments of the present invention depicted in FIGS. 1-7 and 8A.
Figure 8C:
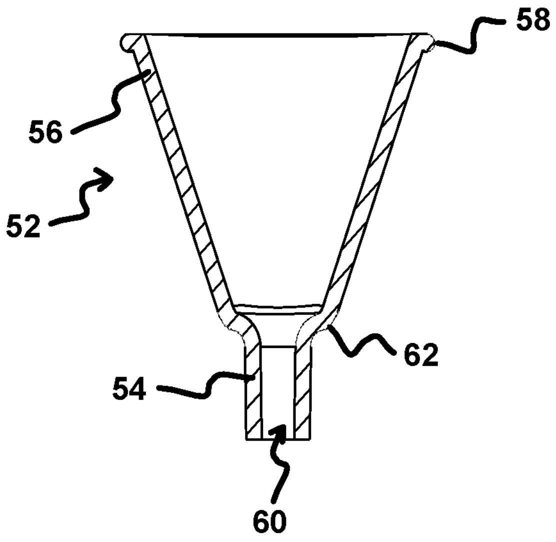
FIG. 8C is a cross-sectional view from a side of a mouthpiece of a stimulation device with variable pressure apparatus according to the preferable embodiments of the present invention depicted in FIGS. 1-7 and 8A-B.

Referring now to FIGS. 8A-C, a preferable embodiment of a mouthpiece 52 according to the present invention is shown. The attachment end 54 is preferably sized and shaped to connect to the manual operation end 44 of the hose attachment 42 of suction tube 40, as depicted. Meanwhile, a ridge 62 may be included in preferable embodiments, which acts to prevent the hose attachment 42 from sliding too far along the mouthpiece 52 and causing undesired stretching of the hose attachment 42, which could affect its ability to form an airtight seal after repeated uses, particularly in preferable embodiments where the mouthpiece 52 is removeable from the suction tube 40 for cleaning and maintenance.

As shown, preferable embodiments of the mouthpiece 52 also include a raised portion or ridge 58 at the contact end 56, which is intended to be used by the user to apply suction or blow air through the device 10. The raised portion or ridge 58 assists in retaining the mouthpiece 52 in the user's mouth during use, so that positive or negative air pressure can be consistently applied or varied, according to the user's preferences. Aperture 60 extends from the contact end 56 to the attachment end 54 to transfer the positive or negative air pressure the user creates into the hose attachment 42 and, ultimately, to the user's erogenous zone where the body contact ring 34 is placed. As noted above, preferable embodiments of the suction tube 40 also include hose clip 50, which can be used to collapse the hose attachment 42 and maintain consistent negative pressure without the user continuing to operate the mouthpiece 52 throughout the entirety of the experience.

Those skilled in the art will recognize that, while the present invention has been described with reference to particular embodiments and arrangements of parts, features, and the like, it is not limited to these embodiments or arrangements. Indeed, modifications and variations will be ascertainable to those of skill in the art, all of which are inferentially and inherently included in these teachings.

What is claimed is:

1. A stimulation device, comprising:

a cup-shaped body, a variable pressure apparatus, and a suction tube;

the cup-shaped body comprising an outer wall with an opening forming a receptacle sized and shaped to receive a vibrating component of a vibrating masturbatory device, the outer wall forming a cup that snugly surrounds the vibrating component in a manner that vibration is transferred from the vibrating masturbatory device to the stimulation device;

the variable pressure apparatus comprising a main body and one or more air-passage conduits, the main body comprising a hood forming a tube-attachment conduit removably connected to the suction tube;

the one or more air-passage conduits comprising an extension portion and a body-contact ring formed at an end of the extension portion intended to contact a user; and the suction tube comprising a hose attachment comprising a first end removably connected to the tube-attachment conduit of the main body and a second end open to the user to deliver positive or negative pressure to the stimulation device;

wherein each of the suction tube, the tube-attachment conduit, and the one or more air-passage conduits are in sealed fluid communication with each other in a manner that the positive or negative pressure the user delivers at the second end of the hose attachment of the suction tube is transferred through the device to the body-contact ring of the air-passage conduit.

2. The stimulation device of claim 1, wherein the outer wall of the cup-shaped body is tapered toward the opening in a manner as to retain the vibrating masturbatory device therein during use in a manner that the vibrating masturbatory device is slidably attachable to and removable from the cup-shaped body.

3. The stimulation device of claim 2, wherein the outer wall of the cup-shaped body comprises a thermoplastic elastomeric material.

4. The stimulation device of claim 1, wherein the one or more air-passage conduits of the variable pressure apparatus are removably attachable to the main body of the variable pressure apparatus.

5. The stimulation device of claim 4, wherein the extension portion of each of the one or more air-passage conduits further comprises a ridge projecting circumferentially around the extension portion, the ridge being located at or near an end of the extension portion opposite the body-contact ring; and wherein the main body of the variable pressure apparatus further comprises a groove sized and arranged to receive the ridge of the extension portion in a manner that the extension portion is removably retained by the main body while the stimulation device is in use.

6. The stimulation device of claim 5, wherein the extension portion of each of the one or more air-passage conduits comprises a semi-rigid material in a manner that the one or more air-passage conduits are slidably attachable to and removable from the main body.

7. The stimulation device of claim 1, wherein the body-contact ring comprises a smooth, semi-rigid material.

8. The stimulation device of claim 1, wherein the suction tube further comprises a mouthpiece located at the second end.

9. The stimulation device of claim 8, wherein the mouthpiece comprises:

a first end removably connected to the hose attachment;

a raised lip portion disposed at or near a second end to assist in retaining the mouthpiece in the user's mouth during use of the stimulation device; and an aperture extending through the mouthpiece from the first end to the second end.

10. The stimulation device of claim 9, wherein the mouthpiece further comprises a ridge located near the first end to provide a barrier past which the hose attachment is configured to not extend while attached to the mouthpiece.

11. The stimulation device of claim 8, wherein the mouthpiece comprises a polyethylene material.

12. The stimulation device of claim 1, wherein the hose attachment of the suction tube comprises a semi-rigid polyethylene material.

13. The stimulation device of claim 1, further comprising a hose clip configured to compress the hose attachment of the suction tube to form a fully enclosed chamber within which constant pressure is maintained so long as the body-contact ring of the air-passage conduit is retained against the user's skin.

14. A stimulation device for combining vibration with variable application of positive and negative pressure to a user's erogenous zones, comprising:

a cup-shaped body comprising an outer wall with an opening forming a receptacle sized and shaped to receive a vibrating component of a vibrating masturbatory device, the outer wall forming a cup that snugly surrounds the vibrating component in a manner that vibration is transferred from the vibrating masturbatory device to the stimulation device;

a variable pressure apparatus comprising a main body and one or more air-passage conduits, the main body comprising a hood forming a tube-attachment conduit;

the one or more air passage conduits each comprising an extension portion with a first end and a second end, a body-contact ring located on the first end, a ridge located at or near the second end and projecting circumferentially around the extension portion, and an aperture extending through the extension portion from the first end to the second end, the aperture being in fluid communication with the tube-attachment conduit of the main body; and a suction tube comprising a hose attachment and a mouthpiece, the hose attachment comprising a first end removably connected to the mouthpiece and a second end removably connected to the tube-attachment conduit of the main body, placing each of the mouthpiece, the hose attachment, the tube-attachment conduit, and the one or more air-passage conduits in fluid communication;

wherein a user attaches the stimulation device to the vibrating masturbatory device, places the body-contact ring against the skin of the user, and uses the mouthpiece to variably apply positive and negative pressure, wherein each of the suction tube, the tube-attachment conduit, and the one or more air-passage conduits are in sealed fluid communication with each other in a manner that the positive or negative pressure the user variably applies using the mouthpiece is transferred through the device to the body-contact ring of the air-passage conduit.

15. The stimulation device of claim 14, further comprising a hose clip configured to compress the hose attachment of the suction tube to form a fully enclosed chamber within which constant pressure is maintained so long as the body-contact ring of the air-passage conduit is retained against the user's skin.

16. The stimulation device of claim 14, wherein the outer wall of the cup-shaped body comprises a thermoplastic elastomeric material and is tapered toward the opening in a manner as to retain the vibrating masturbatory device therein during use in a manner that the vibrating masturbatory device is slidably attachable to and removable from the cup-shaped body.

17. The stimulation device of claim 14, wherein the extension portion of each of the one or more air-passage conduits comprises a semi-rigid material in a manner that the one or more air-passage conduits are interchangeable and slidably attachable to and removable from the main body.

18. The stimulation device of claim 14, wherein the body-contact ring comprises a smooth, semi-rigid material.

19. The stimulation device of claim 14, wherein the hose attachment of the suction tube comprises a semi-rigid polyethylene material.

20. The stimulation device of claim 14, wherein the mouthpiece comprises a polyethylene material.

* * * * *